US012128001B2

(12) United States Patent
Huang et al.

(10) Patent No.: US 12,128,001 B2
(45) Date of Patent: Oct. 29, 2024

(54) AIRWAY STRUCTURE OF A MASSAGE POOL WITH COMPENSATION FUNCTION AND MASSAGE POOL

(71) Applicant: Intex Marketing Ltd., Tortola (VG)

(72) Inventors: Zhi Xiong Huang, Fujian (CN); Ai Ming Tan, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 18/579,211

(22) PCT Filed: Jul. 15, 2022

(86) PCT No.: PCT/IB2022/056556

§ 371 (c)(1),
(2) Date: Jan. 12, 2024

(87) PCT Pub. No.: WO2023/286034

PCT Pub. Date: Jan. 19, 2023

(65) Prior Publication Data

US 2024/0261184 A1 Aug. 8, 2024

(30) Foreign Application Priority Data

Jul. 15, 2021 (CN) ......................... 202121613882.0

(51) Int. Cl.
*A61H 33/02* (2006.01)
*A61H 33/00* (2006.01)

(52) U.S. Cl.
CPC ....... *A61H 33/028* (2013.01); *A61H 33/6005* (2013.01); *A61H 2033/022* (2013.01); *A61H 2201/5053* (2013.01)

(58) Field of Classification Search
CPC .............. A61H 33/028; A61H 33/6005; A61H 2033/022; A61H 2201/5053; A61H 2201/0103; F16K 3/08
See application file for complete search history.

(56) References Cited

U.S. PATENT DOCUMENTS 3,810,464 A * 5/1974 Sheeler ............. B01F 23/23121 601/167
4,566,443 A 1/1986 Bucher
(Continued)

FOREIGN PATENT DOCUMENTS

CN 1596864 A 3/2005
CN 2794505 Y 7/2006
(Continued)

OTHER PUBLICATIONS

International Search Report and Written Opinion issued by the International Searching Authority, dated Oct. 10, 2022, for International Patent Application No. PCT/IB2022/056556; 9 pages.
(Continued)

*Primary Examiner* — Erin Deery
(74) *Attorney, Agent, or Firm* — Faegre Drinker Biddle & Reath LLP

(57) ABSTRACT

An airway structure of a massage pool may have a compensation function. The airway structure may comprise a pipeline, a control valve group, an air connection sleeve, a first elastic body, and a second elastic body. The pipeline may comprise a fixed air connection portion and a sealing plate. The control valve group may comprise a control plate. The control plate may be located under the sealing plate. The first elastic body may be attached between the pipeline and the control valve group and abut against the control valve group to make the control plate abut under the sealing plate. The fixed air connection portion may be provided with an air connection port. The air connection sleeve may translatable relative to the air connection port. The second elastic body may be mounted between the air connection portion and the air connection sleeve and abuts against the air connection sleeve to make the air connection sleeve abut under the control plate.

8 Claims, 12 Drawing Sheets

11
4
5
3
2
21
1
13
32
22
24
40

(56) References Cited

U.S. PATENT DOCUMENTS

| | | | |
|---|---|---|---|
| 4,773,104 | A | 9/1988 | Wang |
| 4,981,543 | A | 1/1991 | Popovich et al. |
| 5,283,915 | A | 2/1994 | Idland et al. |
| 5,809,942 | A | 9/1998 | Kralovec et al. |
| 6,003,166 | A | 12/1999 | Hald et al. |
| 6,108,829 | A | 8/2000 | Wadsworth |
| 6,199,224 | B1 | 3/2001 | Versland |
| 6,357,059 | B1 | 3/2002 | Lau |
| 6,412,123 | B1 | 7/2002 | Lau |
| 7,334,274 | B2 | 2/2008 | Wang |
| 7,503,082 | B2 | 3/2009 | Castellote |
| 11,179,733 | B1 | 11/2021 | Wang et al. |
| 2005/0050627 | A1 | 3/2005 | Ayeni et al. |
| 2006/0115248 | A1 | 6/2006 | Tran |
| 2006/0260038 | A1 | 11/2006 | Lau |
| 2011/0010836 | A1 | 1/2011 | Lau |
| 2012/0124732 | A1 | 5/2012 | Lau |
| 2018/0231283 | A1 | 8/2018 | Willers |
| 2022/0241148 | A1 | 8/2022 | Wang |
| 2022/0325546 | A1 | 10/2022 | Lin et al. |

FOREIGN PATENT DOCUMENTS

| | | | |
|---|---|---|---|
| CN | 202732280 | U | 2/2013 |
| CN | 109424221 | A | 3/2019 |
| CN | 111895140 | A | 11/2020 |
| CN | 112443180 | A | 3/2021 |
| CN | 112502498 | | 3/2021 |
| EP | 0168822 | A2 * | 1/1986 |
| EP | 0967446 | | 12/1999 |
| JP | 2006-308009 | A | 11/2006 |
| JP | 4041132 | | 1/2008 |
| WO | 2015/010058 | A2 | 1/2015 |
| WO | 2021/042966 | A1 | 3/2021 |

OTHER PUBLICATIONS

International Report on Patentability issued by the International Preliminary Examining Authority, dated Jun. 7, 2023, for International Patent Application No. PCT/IB2022/056556; 15 pages.

International Preliminary Report on Patentability issued by the International Preliminary Examining Authority, dated Jun. 28, 2023, for International Patent Application No. PCT/IB2022/056545; 21 pages.

International Preliminary Report on Patentability issued by the International Preliminary Examining Authority, dated Jun. 5, 2023, for International Patent Application No. PCT/IB2022/056536; 16 pages.

International Preliminary Report on Patentability issued by the International Preliminary Examining Authority, dated Jun. 5, 2023, for International Patent Application No. PCT/IB2022/056542; 13 pages.

International Search Report and Written Opinion issued by the International Searching Authority, dated Oct. 10, 2022, for International Patent Application No. PCT/IB2022/056536; 11 pages.

International Search Report and Written Opinion issued by the International Searching Authority, dated Oct. 14, 2022, for International Patent Application No. PCT/IB2022/056542; 9 pages.

International Search Report and Written Opinion received for PCT Patent Application No. PCT/IB2022/056545, mailed on Dec. 5, 2022, 15 pages.

Invitation to Pay Additional Fee issued by the International Searching Authority, dated Oct. 14, 2022, for International Patent Application No. PCT/IB2022/056545; 9 pages.

* cited by examiner

AIRWAY STRUCTURE OF A MASSAGE POOL WITH COMPENSATION FUNCTION AND MASSAGE POOL

RELATED APPLICATIONS

The present application is a national stage entry of International (PCT) Patent Application Number PCT/IB2022/056556, filed Jul. 15, 2022, which claims priority to Chinese Utility Model Application No. CN202121613882.0, filed Jul. 15, 2021, the entire disclosures of which are expressly incorporated by reference herein.

Additionally, the present application is related to Chinese Utility Model Application No.: CN202121613803.6 filed Jul. 15, 2021; Chinese Utility Model Application Number No. CN202121614976.X, filed Jul. 15, 2021; Chinese Patent Application No. CN202110800425.0, filed Jul. 15, 2021; Chinese Utility Model Application No. CN202121613986.1, filed Jul. 15, 2021; Chinese Patent Application No. CN202110801708.7, filed Jul. 15, 2021; and Chinese Utility Model Application No. CN202121618990.7, filed Jul. 15, 2021, the entire disclosures of which are expressly incorporated by reference herein.

FIELD

The present invention relates to the technical field of massage pools and components thereof, in particular to an airway structure of a massage pool with compensation function and a massage pool.

BACKGROUND

The airway structure of a conventional massage pool comprises a pipeline and a control valve group. The pipeline comprises a relatively fixed air connection portion. The air connection portion is provided with an air connection port. The control valve group comprises a control plate. The control plate comprises the air port (it can also define as ventilation port). The control plate is rotatably connected on the air connection port. The air port and air connection port are controlled by the rotation of the control plate relative to the air connection portion to realize charging and exhausting or the air port and air connection port are sealed to realize sealing. Due to long-term use, the tight fit between the control plate and the peripheral ring of the air connection port may be loosened, and air leakage may occur.

SUMMARY

In an exemplary embodiment of the present disclosure, an airway structure of a massage pool with compensation function is provided.

In another exemplary embodiment of the present disclosure, an airway structure of a massage pool with compensation function is provided. The airway structure comprising: a pipeline, a control valve group, an air connection sleeve, a first elastic body, and a second elastic body. The pipeline comprises a fixed air connection portion and a sealing plate. The control valve group comprises a control plate. The control plate is located under the sealing plate. The first elastic body is attached between the pipeline and the control valve group and abuts against the control valve group to make the control plate abut under the sealing plate. The fixed air connection portion is provided with an air connection port. The air connection sleeve is translatable relative to the air connection port. The second elastic body is mounted between the air connection portion and the air connection sleeve and abuts against the air connection sleeve to make the air connection sleeve abut under the control plate.

In an example thereof, the control valve group comprises an air baffle fixedly mounted under the control plate, and the first elastic body abuts against the air baffle.

In another example thereof, the control valve group is connected in the pipeline in rotation, and the control plate is provided with a ventilation port. The control valve group rotates and controls the ventilation port to be connected to the air connection sleeve.

In a further example thereof, the pipeline comprises a surrounding wall and a bottom wall sealed and fixed on the lower periphery of the surrounding wall. The sealing plate is fixed in the surrounding wall. The fixed air connection portion is fixedly connected with the surrounding wall. The fixed air connection portion has a connecting base that protrudes into the surrounding wall, the air connection portion is provided with an air connection passage, the upper end surface of the connecting base is concaved with an air connection portion of the air connection passage, the control plate is located on the connecting base and in the surrounding wall. In a variation thereof, a fixing column is fixed on the outside of the air connection sleeve through a spacer. A groove is concavely formed on the upper end surface of the connecting base. The air connection sleeve is adapted to be inserted into the air connection port. The fixing column is inserted into the groove. The second elastic body is inserted into the groove and abuts between a groove bottom of the groove and the fixing column. In another variation thereof, the upper edge of the air connection sleeve extends outward to form an outer flange. The outer flange is located outside the air connection port. In a further variation thereof, the control valve group comprises an air baffle fixedly mounted under the control plate. The first elastic body abuts between the air baffle and the bottom wall. In yet another variation thereof, a convex column is protruded from the bottom of the air baffle. The first elastic body is sleeved on the convex column.

In yet another example thereof, the control plate is rotatably connected to the pipeline and the control plate is rotated between at least two switching positions relative to the pipeline. The bottom surface of the control plate is provided with an abutting area. The abutting area is set between every two adjacent switching positions. The air connection sleeve is driven to press down through the abutting area.

In yet another exemplary embodiment of the present disclosure, a massage pool is provided with the airway structure of one of the exemplary embodiments above and optionally, one or more of the above examples and variations.

BRIEF DESCRIPTION OF DRAWINGS

The foregoing aspects and many of the intended advantages of this disclosure will become more readily appreciated as the same becomes better understood by reference to the following detailed description when taken in conjunction with the accompanying drawings.

Figure 1:
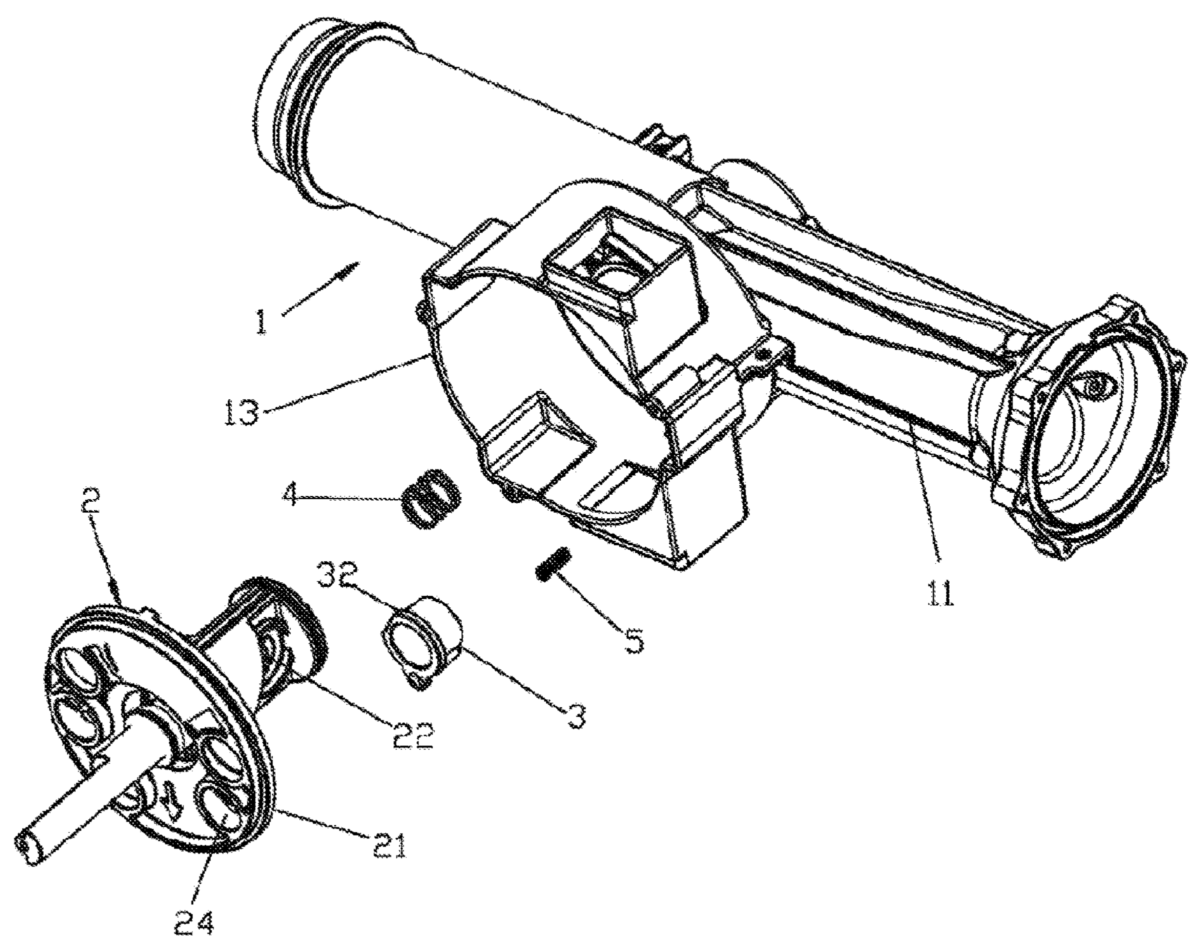
FIG. 1 illustrates a schematic exploded view of an exemplary airway structure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF THE DRAWINGS

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

In the description, it should be noted that the terms upper, lower, inner, outer, top/bottom, etc. indicating the orientation or positional relationship based on the orientation shown in the drawings are only for the convenience of simplifying the description, rather than indicating or implying that the pointed device or element must have a specific orientation, be constructed and operated in a specific orientation, and therefore cannot be understood as a limitation of the present disclosure. In addition, the terms first and second are only used for descriptive purposes, and cannot be understood as indicating or implying relative importance.

The terms “couples”, “coupled”, “coupler”, and variations thereof are used to include both arrangements wherein two or more components are in direct physical contact and arrangements wherein the two or more components are not in direct contact with each other (e.g., the components are “coupled” via at least a third component, but yet still cooperates or interact with each other).

The present disclosure is related to the devices and systems disclosed in the following applications: PCT Patent Application No. PCT/IB2022/056545, filed Jul. 15, 2022, titled AN AIRWAY SYSTEM OF A MASSAGE POOL, COMPRISES AN AIR PUMP AND AN AIRWAY UNIT, PCT Patent Application No. PCT/IB2022/056536, filed Jul. 15, 2022, titled AN AIRWAY STRUCTURE OF A MASSAGE POOL WITH A CONTROL VALVE, and PCT Patent Application No. PCT/IB2022/056542, filed Jul. 15, 2022, titled AN AIR CONNECTION PIPING DEVICE FOR A MASSAGE POOL, A POOL BODY OF A MASSAGE POOL AND A MASSAGE POOL, the entire disclosures of which are expressly incorporated by reference herein.

Embodiment 1

Referring to FIGS. 1-8, an airway structure 100 of a massage pool with compensation function is illustrated. The airway structure 100 comprises a pipeline 1, a control valve group 2, an air connection sleeve 3, a first elastic body 4 and a second elastic body 5.

Figure 1A:
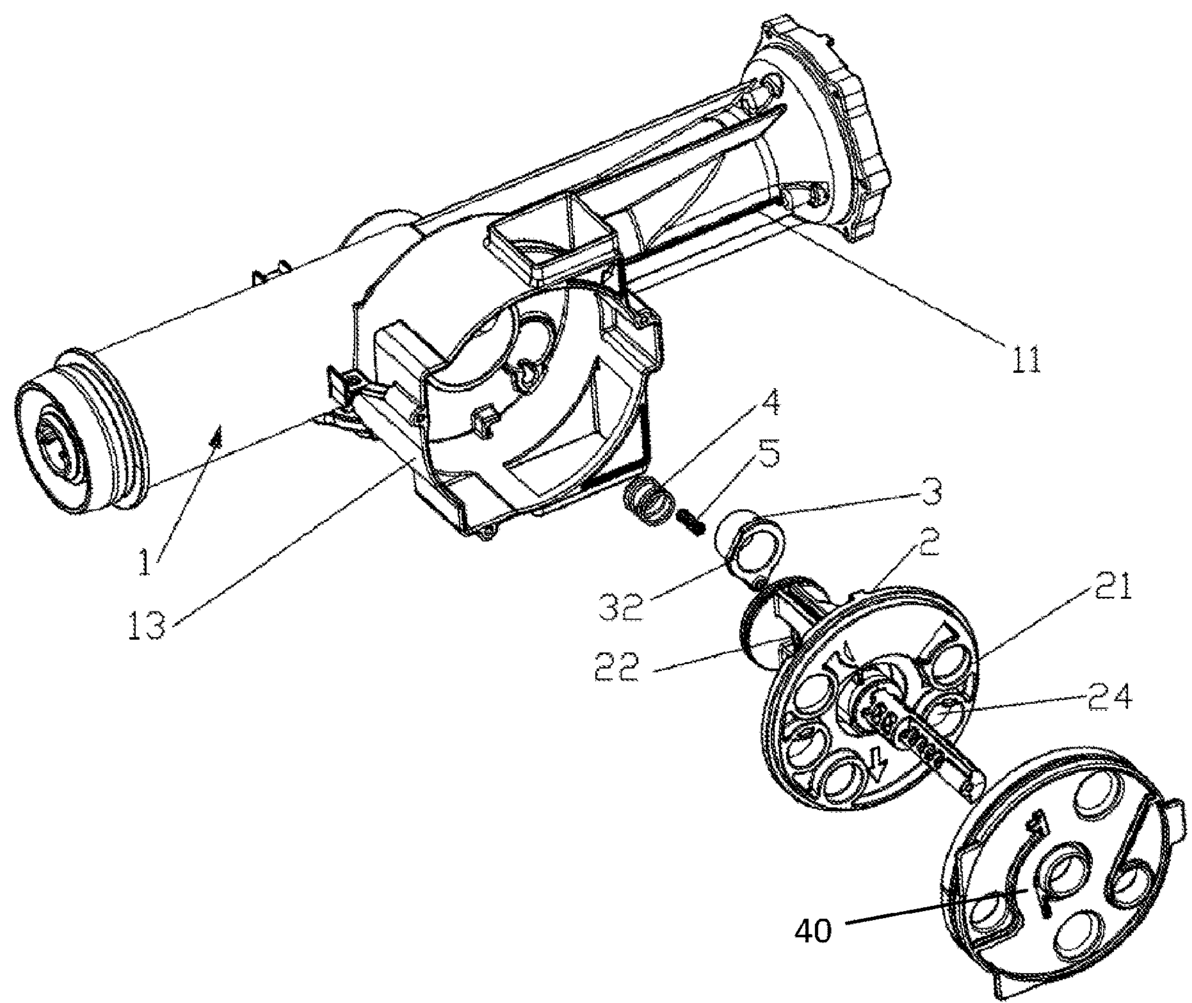
FIG. 1A illustrates a second exploded view of the exemplary airway structure of FIG. 1.
Figure 2:
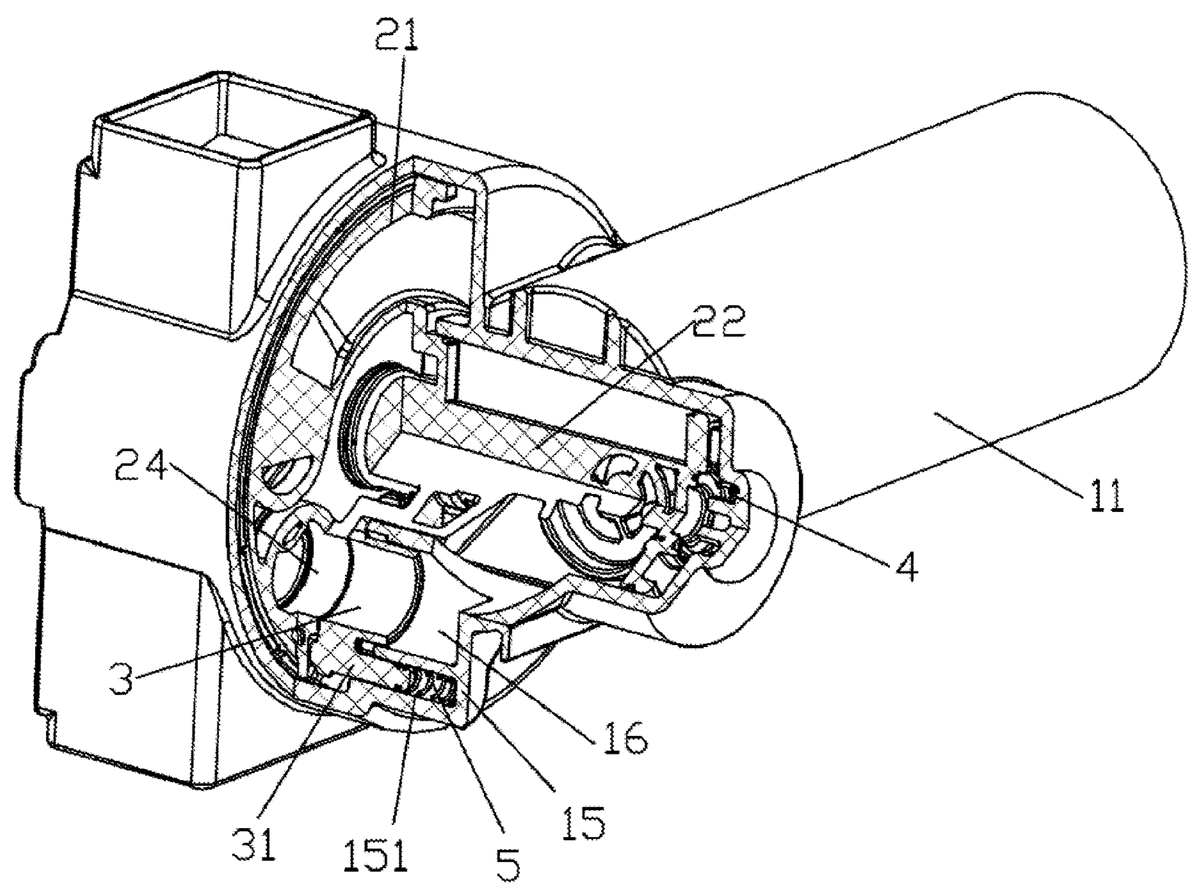
FIG. 2 illustrates a first schematic cross-sectional view of the exemplary airway structure of FIG. 1 in an exhaust state.
Figure 3:
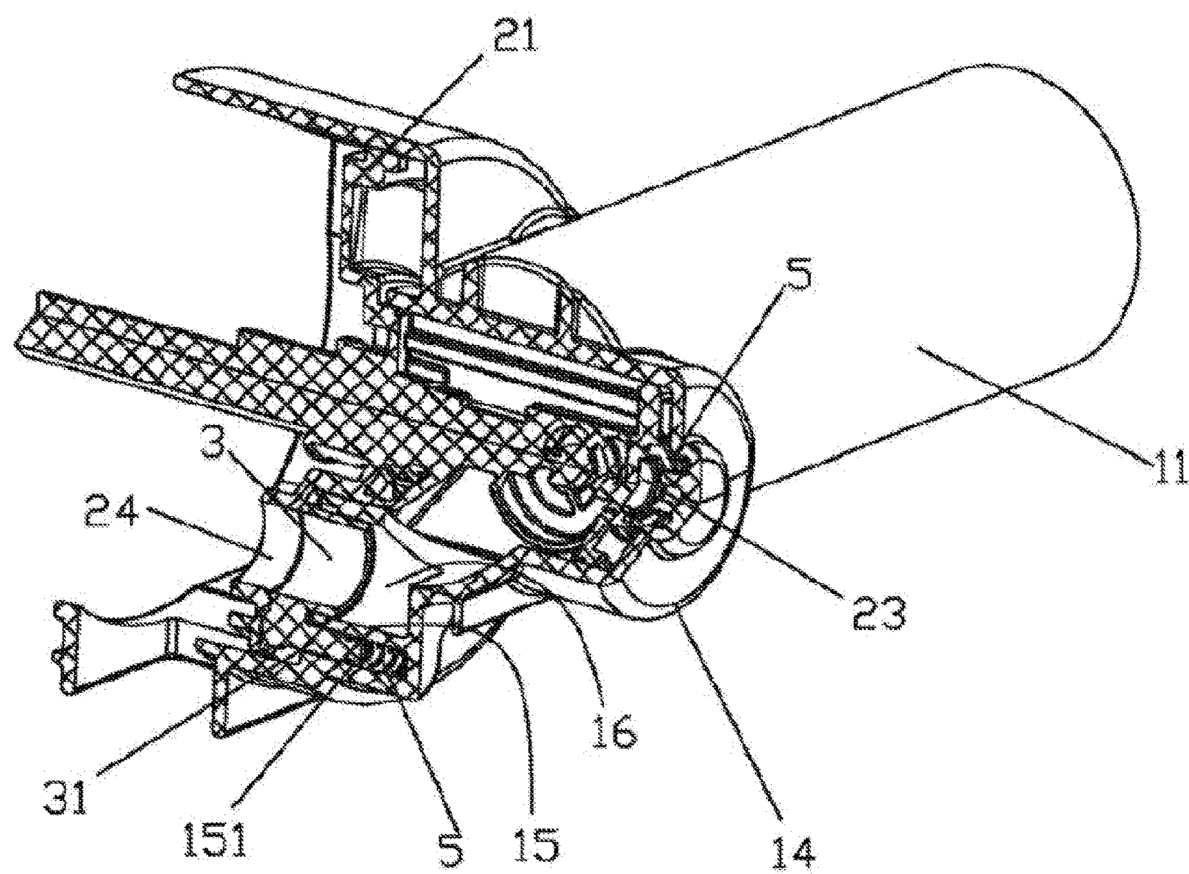
FIG. 3 illustrates a second schematic cross-sectional view of the exemplary airway structure of FIG. 1 in the exhaust state.
Figure 3A:
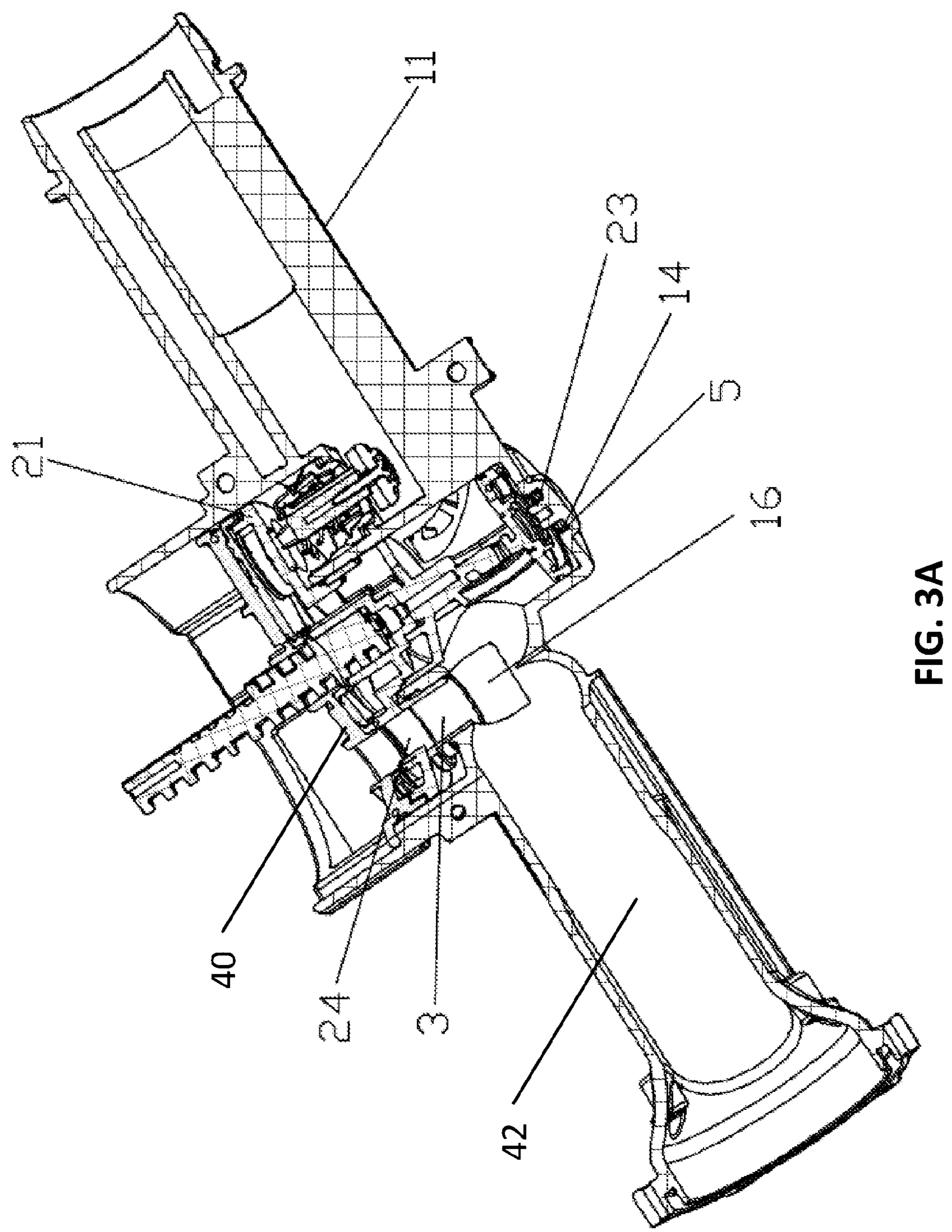
FIG. 3A illustrates a further schematic cross-sectional view of the exemplary airway structure of FIG. 1 in the exhaust state.
Figure 4:
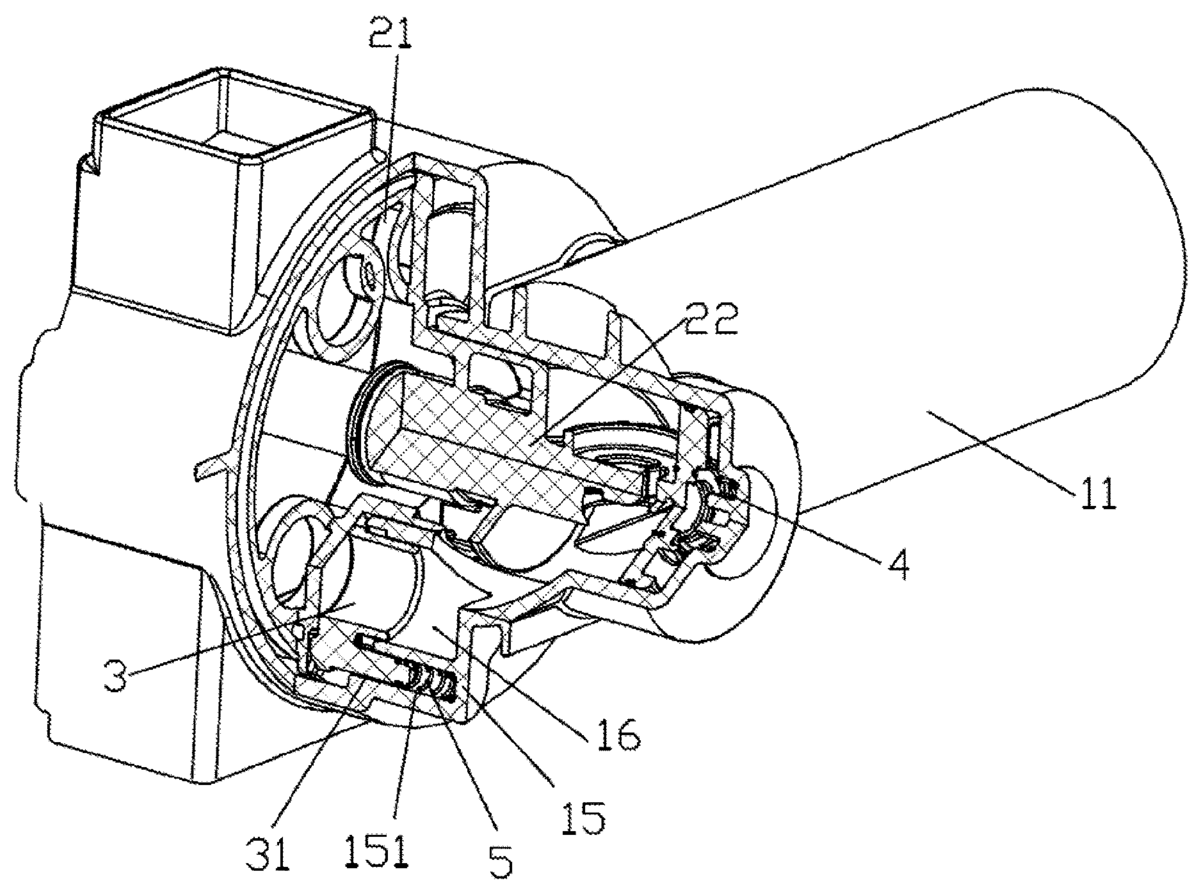
FIG. 4 illustrates a first schematic cross-sectional view of the exemplary airway structure of FIG. 1 in a closed state.
Figure 5:
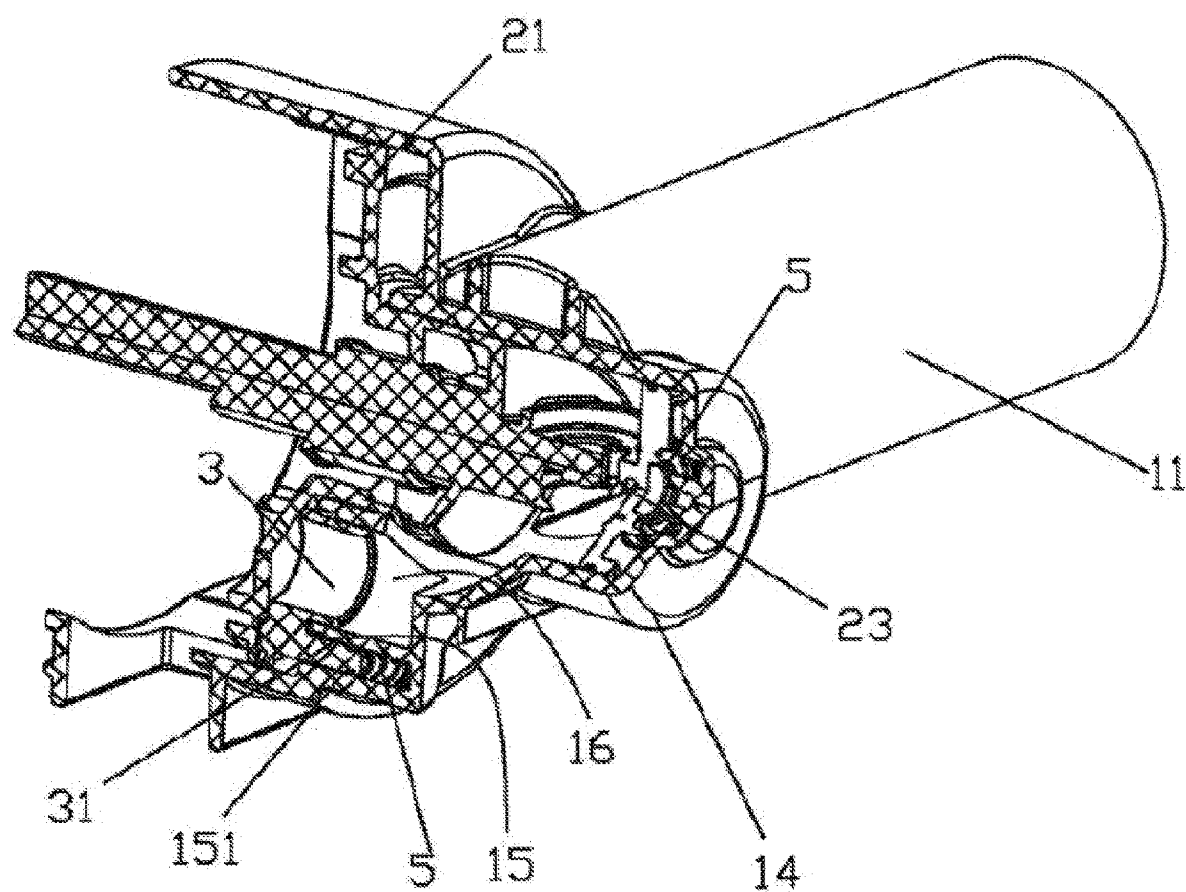
FIG. 5 illustrates a second schematic cross-sectional view of the exemplary airway structure of FIG. 1 in the closed state.
Figure 5A:
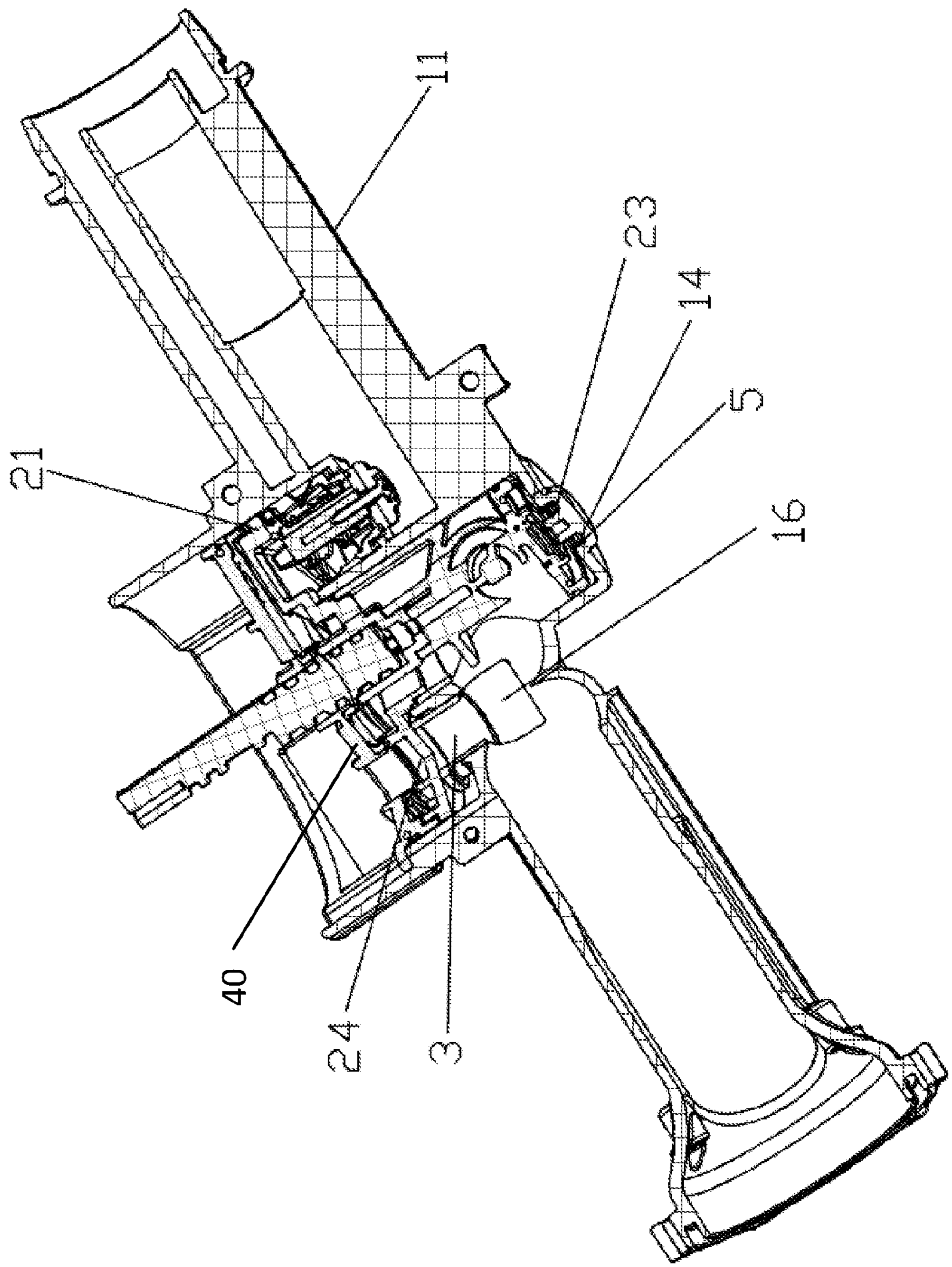
FIG. 5A illustrates a further schematic cross-sectional view of the exemplary airway structure of FIG. 1 in the closed state.
Figure 6:
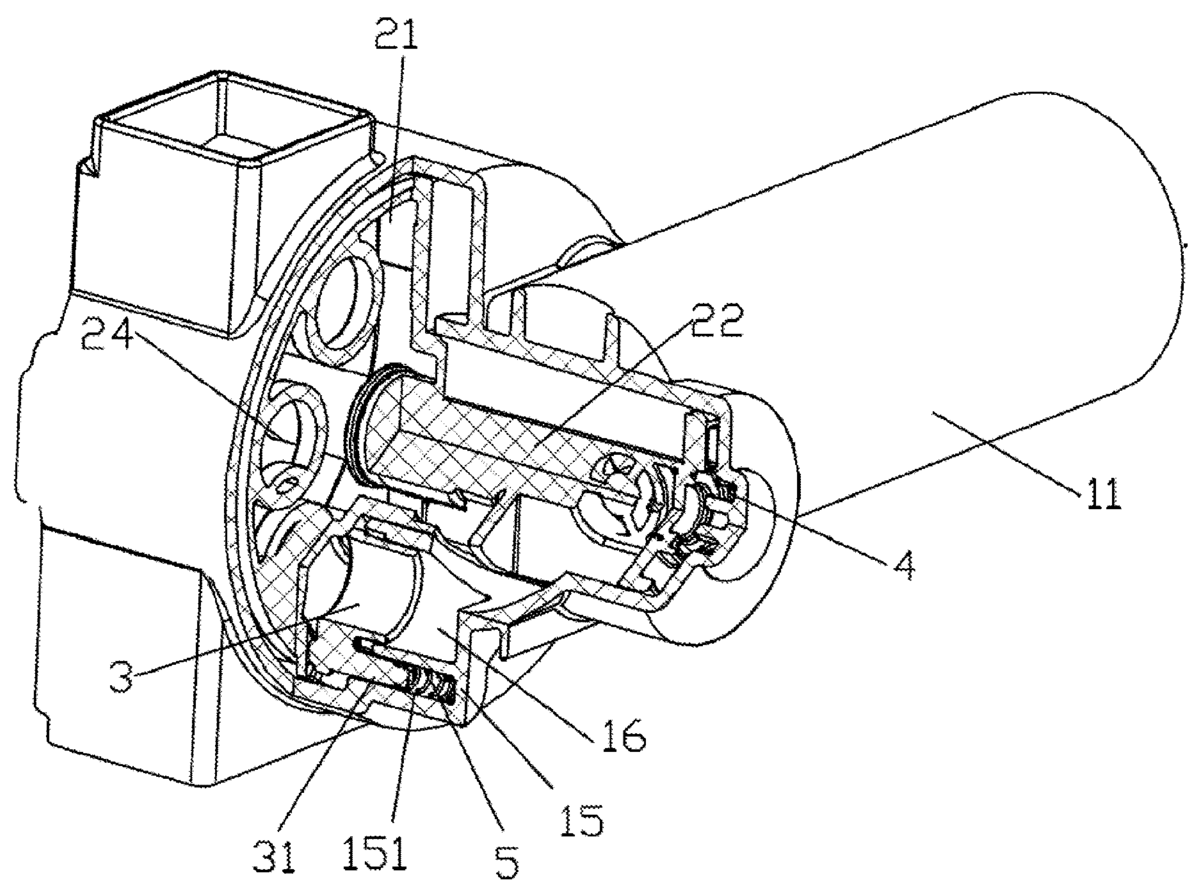
FIG. 6 illustrates a first cross-sectional schematic view 1 of the exemplary airway structure of FIG. 1 in an air intake state.
Figure 7:
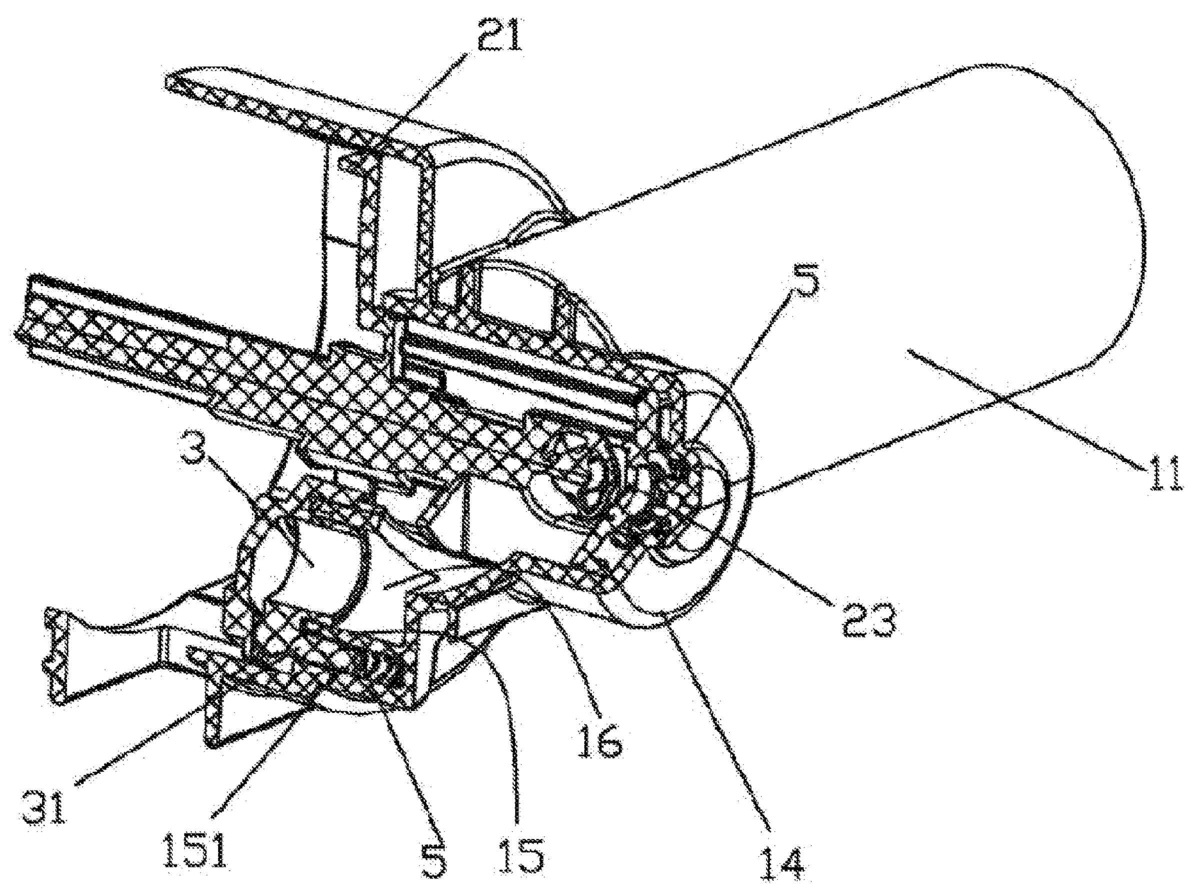
FIG. 7 illustrates a second cross-sectional schematic view of the exemplary airway structure of FIG. 1 in the air intake state.
Figure 7A:
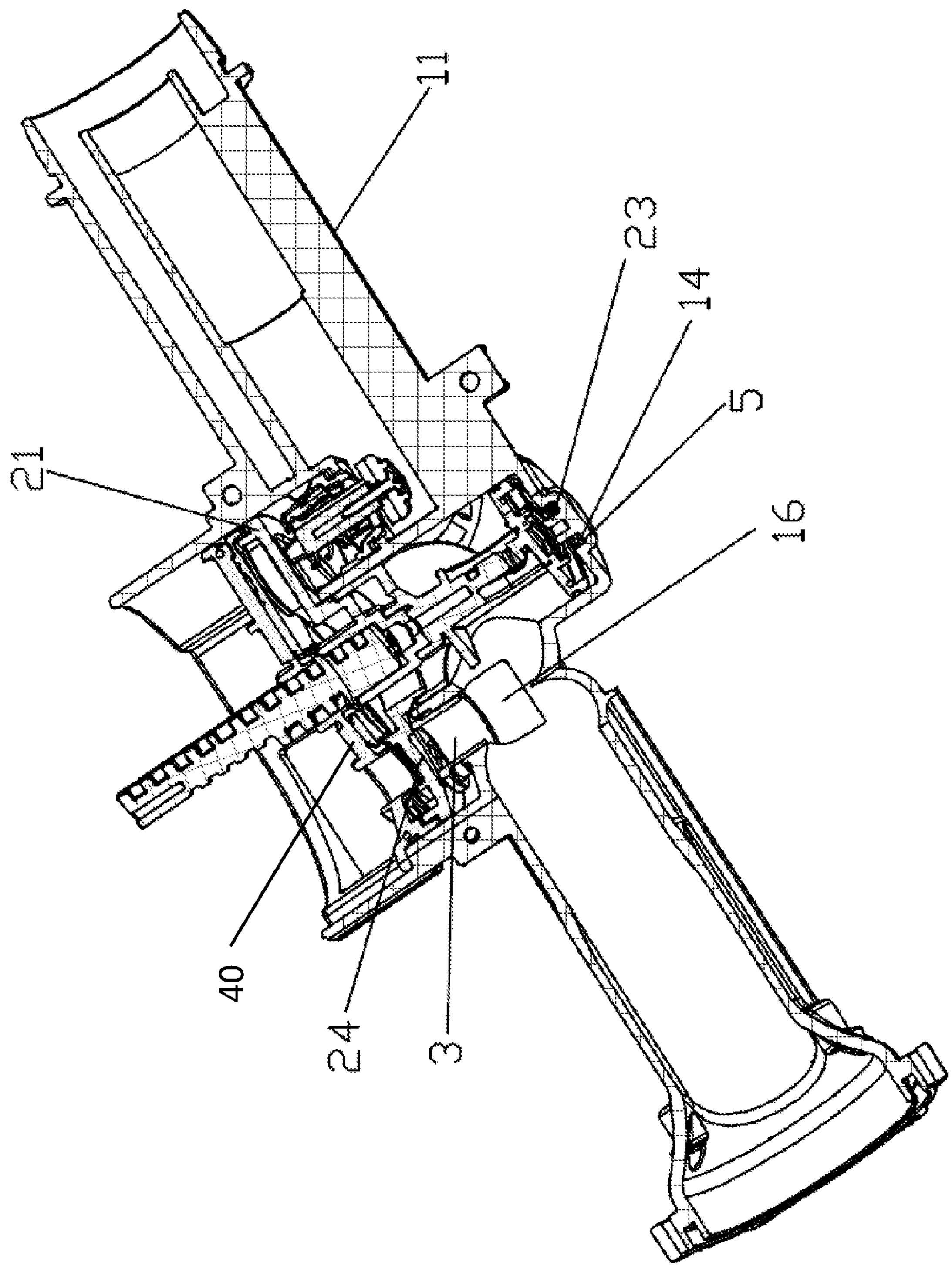
FIG. 7A illustrates a further schematic cross-sectional view of the exemplary airway structure of FIG. 1 in the air intake state.
Figure 8:
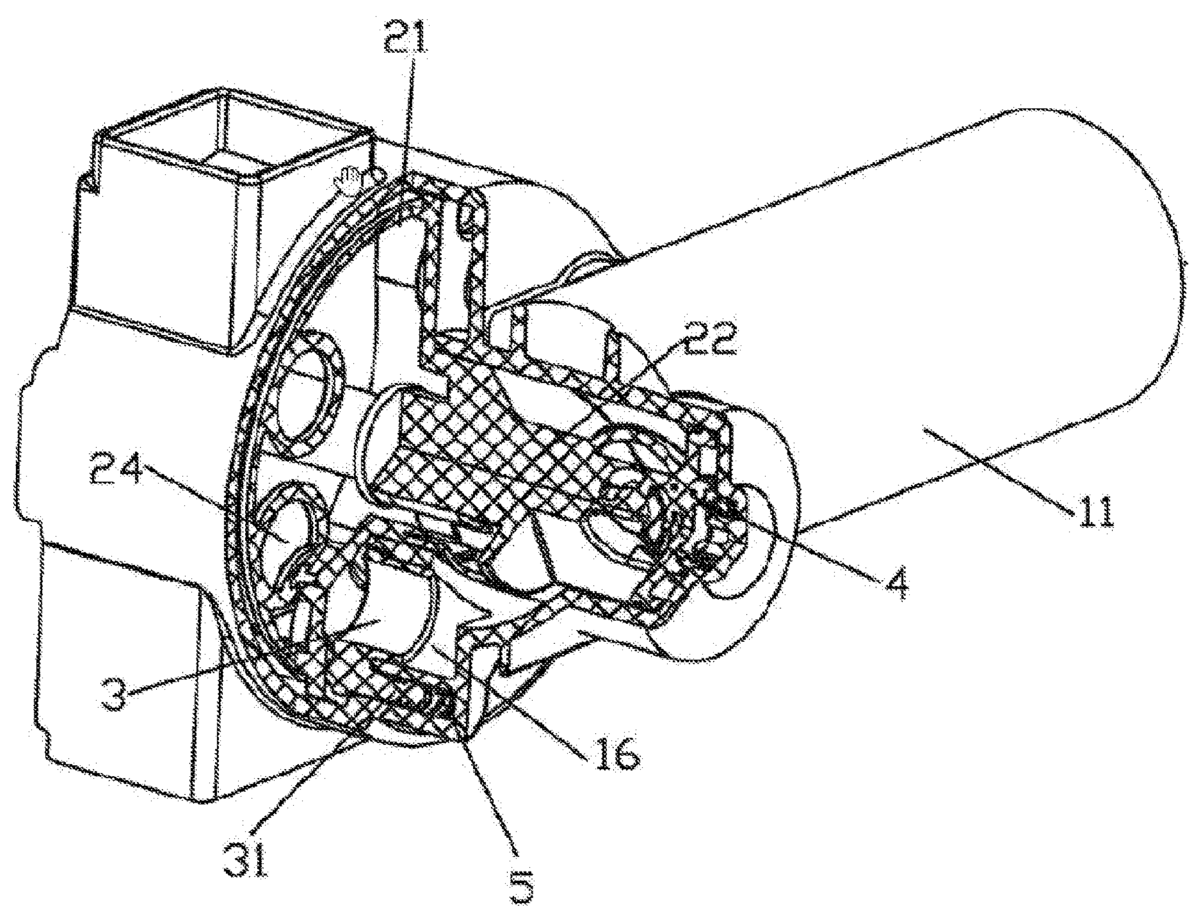
FIG. 8 illustrates a schematic cross-sectional view of the exemplary airway structure of FIG. 1 in the process of switching.

The pipeline 1 comprises a relatively fixed air connection portion 11 and a sealing plate 40 (see FIG. 1A). In embodiments, the pipeline 1 further comprises a surrounding wall 13 and a bottom wall 14 (see FIG. 3) provided on the lower periphery of the surrounding wall 13. The air connection portion 11 and the surrounding wall 13 are fixedly connected. The air connection portion 11 has a connecting base 15 (see FIG. 3) protruding into the surrounding wall 13. The air connection portion 11 is provided with an air connection passage 42. The upper end surface of the connecting base 15 is concavely provided with the air connecting port 16 (see FIG. 3A) of the air connection passage 42. The sealing plate 40 may be assembled and disassembled in the surrounding wall 13 and is located on the connecting base 15.

Referring to FIG. 1, the control valve group 2 comprises a control plate 21 and an air baffle 22 fixedly mounted under the control plate 21. The air baffle 22 is inserted into the surrounding wall 13. The control plate 21 is located under the sealing plate and above the connecting base 15 (see FIG. 3A). The first elastic body 4 is located in the surrounding wall 13 and is attached between the bottom wall 14 and the control valve group 2 and abuts against the control valve group 2 to make the control plate 21 abut under the sealing plate. In embodiments, the air baffle 22 is protruded with a convex column 23 and the first elastic body 4 is a spring and is sleeved on the convex column 23, and abuts between the air baffle 22 and the bottom wall 14.

The air connection sleeve 3 slides up and down on the air connection port 16. The second elastic body 5 is mounted between the air connection portion 11 and the air connection sleeve 3 and abuts against the air connection sleeve 3 so that the air connection sleeve 3 abuts under the control plate 21. Through the first and second elastic bodies, the air connection sleeve 3 is always tightly fitted with the control plate 21, so as to realize compensation through the first and second elastic bodies 4 and 5.

In embodiments, a fixing column 31 is fixed on the outside of the air connection sleeve 3 through a spacer. A groove 151 is recessed on the upper end surface of the connection base 15. The air connection sleeve 3 is adapted to be inserted into the air connection port 16. The fixing column 31 is inserted into the groove 151. The second elastic body 5 is a spring. The spring 5 is inserted into the groove 151 and abuts between the groove bottom of the groove 151 and the end surface of the fixing column 31. Advantageously, the structure is simple, the assembly is convenient, and the compensation is stable and reliable; The upper edge of the air connection sleeve 3 extends outward to form an outer flange 32. The outer flange 32 is located outside the air connection port to define the deepest insertion position of the air connection sleeve.

The control valve group 2 may be rotatably connected in the surrounding wall of the pipeline 1 and can rotate relative to the pipeline between at least two switching positions, the switching position are one-to-one corresponding to ventilation, exhaust, or, a first ventilation, a second ventilation, exhaust. The control plate 21 is provided with a ventilation port 24 (see FIG. 1). The control valve group is rotated to control whether the ventilation port and the air connection sleeve are connected or not. When the air connection sleeve and the air connection port (ventilation port) are in a non-connected state, the control valve group 2 is switched to the closed state to close the airway connection. When the air connection sleeve and the air connection port are in the connected state, there are two positions. In the first position, the air connection sleeve 3 and the air connection port are aligned and connected, then the control valve group 2 switches to the exhaust state for the air connection passage to exhaust. In the second position, the air connection sleeve 3 and the ventilation port 24 are staggered, but the air connection sleeve and the ventilation port are connected through the concave C-shaped groove 151 on the upper end surface of the connecting base 15, and the control valve group 2 is switched to the air intake state for the air connection passage to intake air (see FIGS. 6 and 7). When the control valve group of this specific embodiment is switched, the control plate and the sealing plate can be separated by pressing the control valve group, so as to reduce the friction force between the control plate and the sealing plate, thereby reducing the switching force, and improving the switching convenience.

Further, the bottom surface of the control plate 31 is provided with an abutting area, and the abutting area is set between every two switching positions. The air connection sleeve can be driven to press down through the abutting area. On the one hand, the pressure change of the air connection sleeve can improve the user's switching feel, so that the user can perceive whether the switch is in place by switching the feeling. On the other hand, it can be kept in the switching position to realize the gear position function.

Embodiment 2

A massage pool is provided with above mentioned airway structure of a massage pool with compensation function.

EXAMPLES

Example 1. An airway structure of a massage pool with compensation function may be provided. The airway structure may comprise: a pipeline, a control valve group, an air connection sleeve, a first elastic body, and a second elastic body. The pipeline may comprise a fixed air connection portion and a sealing plate. The control valve group may comprise a control plate. The control plate may be located under the sealing plate. The first elastic body may be attached between the pipeline and the control valve group and may abut against the control valve group to make the control plate abut under the sealing plate. The fixed air connection portion may be provided with an air connection port. The air connection sleeve may be translatable relative to the air connection port. The second elastic body may be mounted between the air connection portion and the air connection sleeve and may abut against the air connection sleeve to make the air connection sleeve abut under the control plate.

Example 2. The airway structure of a massage pool with compensation function according to Example 1, wherein the control valve group may comprise an air baffle fixedly mounted under the control plate. The first elastic body may abut against the air baffle.

Example 3. The airway structure of a massage pool with compensation function according to Example 1, wherein the control valve group may be connected in the pipeline in rotation, and the control plate may be provided with a ventilation port. The control valve group may rotate and control the ventilation port to be connected to the air connection sleeve.

Example 4. The airway structure of a massage pool with compensation function according to Example 1, wherein the pipeline may comprise a surrounding wall and a bottom wall sealed and fixed on the lower periphery of the surrounding wall. The sealing plate may be fixed in the surrounding wall. The fixed air connection portion may be fixedly connected with the surrounding wall. The fixed air connection portion may have a connecting base that protrudes into the surrounding wall. The air connection portion may be provided with an air connection passage. The upper end surface of the connecting base may be concaved with an air connection portion of the air connection passage. The control plate may be located on the connecting base and in the surrounding wall.

Example 5. The airway structure of a massage pool with compensation function according to Example 4, wherein a fixing column may be fixed on the outside of the air connection sleeve through a spacer. A groove may be concavely formed on the upper end surface of the connecting base. The air connection sleeve may be adapted to be inserted into the air connection port. The fixing column may be inserted into the groove. The second elastic body may be inserted into the groove and may abut between a groove bottom of the groove and the fixing column.

Example 6. The airway structure of a massage pool with compensation function according to Example 5, wherein the upper edge of the air connection sleeve may extends outward to form an outer flange. The outer flange may be located outside the air connection port.

Example 7. The airway structure of a massage pool with compensation function according to Example 5, wherein the control valve group may comprise an air baffle fixedly mounted under the control plate. The first elastic body may abut between the air baffle and the bottom wall.

Example 8. The airway structure of a massage pool with compensation function according to Example 7, wherein a convex column may be protruded from the bottom of the air baffle. The first elastic body may be sleeved on the convex column.

Example 9. The airway structure of a massage pool with compensation function according to Example 1, wherein the control plate may be rotatably connected to the pipeline and the control plate may be rotated between at least two switching positions relative to the pipeline, and the bottom surface of the control plate may be provided with an abutting area. The abutting area may be set between every two adjacent switching positions. The air connection sleeve may be driven to press down through the abutting area.

Example 10. A massage pool, characterized in that it may be provided with the airway structure of a massage pool with compensation function according to Example 1.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An airway structure with compensation function, comprising:
- a pipeline,
- a control valve group,
- an air connection sleeve,
- a first elastic body, and
- a second elastic body, wherein the pipeline comprises a fixed air connection portion and a sealing plate; the control valve group comprises a control plate and an air baffle fixedly mounted under the control plate, the control plate is located under the sealing plate, the first elastic body is attached between the pipeline and the control valve group and abuts against the air baffle of the control valve group to make the control plate abut under the sealing plate, the fixed air connection portion is provided with an air connection port, the air connection sleeve is translatable relative to the air connection port, the second elastic body is mounted between the air connection portion and the air connection sleeve and abuts against the air connection sleeve to make the air connection sleeve abut under the control plate.

2. The airway structure with compensation function according to claim 1, wherein the control valve group is connected in the pipeline in rotation, and the control plate is provided with a ventilation port, the control valve group rotates and controls the ventilation port to be connected to the air connection sleeve.

3. The airway structure with compensation function according to claim 1, wherein the pipeline comprises a surrounding wall and a bottom wall sealed and fixed on the lower periphery of the surrounding wall, and the sealing plate is fixed in the surrounding wall, the fixed air connection portion is fixedly connected with the surrounding wall, and the fixed air connection portion has a connecting base that protrudes into the surrounding wall, the air connection portion is provided with an air connection passage, the upper end surface of the connecting base is concaved with an air connection portion of the air connection passage, the control plate is located on the connecting base and in the surrounding wall.

4. The airway structure with compensation function according to claim 3, wherein a fixing column is fixed on the outside of the air connection sleeve through a spacer, a groove is concavely formed on the upper end surface of the connecting base, and the air connection sleeve is adapted to be inserted into the air connection port, the fixing column is inserted into the groove, and the second elastic body is inserted into the groove and abuts between a groove bottom of the groove and the fixing column.

5. The airway structure with compensation function according to claim 4, wherein the upper edge of the air connection sleeve extends outward to form an outer flange, and the outer flange is located outside the air connection port.

6. The airway structure with compensation function according to claim 1, wherein a convex column is protruded from the bottom of the air baffle, and the first elastic body is sleeved on the convex column.

7. The airway structure with compensation function according to claim 1, wherein the control plate is rotatably connected to the pipeline and the control plate is rotated between at least two switching positions relative to the pipeline, and the bottom surface of the control plate is provided with an abutting area, the abutting area is set between every two adjacent switching positions, and the air connection sleeve is driven to press down through the abutting area.

8. A massage pool, characterized in that it is provided with the airway structure with compensation function according to claim 1.

* * * * *